United States Patent
Nakamura (10) Patent No.: US 6,984,050 B2
(45) Date of Patent: Jan. 10, 2006

(54) HELIOSTAT FOR SUNLIGHT CONCENTRATION SYSTEM AND METHOD OF CONTROLLING THE SAME

(75) Inventor: Katsushige Nakamura, Tokyo (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 313 days.

(21) Appl. No.: 10/228,204

(22) Filed: Aug. 27, 2002

(65) Prior Publication Data
US 2004/0004175 A1    Jan. 8, 2004

(30) Foreign Application Priority Data
Jul. 5, 2002    (JP)    ............................. 2002-197826

(51) Int. Cl.
*G02B 5/10*    (2006.01)
*G02B 7/182*    (2006.01)
*G03B 21/00*    (2006.01)

(52) U.S. Cl. ...................... 359/853; 359/855; 359/865; 359/900; 353/3

(58) Field of Classification Search ................ 359/853, 359/855, 865, 900; 353/3; 126/573, 600, 126/685
See application file for complete search history.

(56) References Cited

U.S. PATENT DOCUMENTS

| | | | |
|---|---|---|---|
| 503,004 A * | 8/1893 | Severy | 359/849 |
| 2,707,903 A * | 5/1955 | Trombe | 359/849 |
| 2,987,961 A * | 6/1961 | Cotton et al. | 359/853 |
| 3,466,119 A * | 9/1969 | Giovanni | 359/851 |
| 3,645,606 A * | 2/1972 | La Vantine | 359/853 |
| 3,892,433 A * | 7/1975 | Blake | 290/52 |
| 3,905,352 A * | 9/1975 | Jahn | 126/578 |
| 4,110,009 A * | 8/1978 | Bunch | 359/853 |
| 4,130,109 A * | 12/1978 | Brueck | 126/685 |
| 4,218,114 A * | 8/1980 | Bunch | 359/853 |
| 4,395,581 A * | 7/1983 | Girard | 359/853 |
| 4,463,749 A * | 8/1984 | Sobczak et al. | 126/605 |
| 5,430,577 A * | 7/1995 | Hugenell | 359/846 |
| 5,578,140 A * | 11/1996 | Yogev et al. | 136/246 |
| 5,979,438 A * | 11/1999 | Nakamura | 126/680 |
| 6,226,121 B1 * | 5/2001 | Atkinson et al. | 359/399 |

FOREIGN PATENT DOCUMENTS

JP    H11-119105    4/1999

* cited by examiner

*Primary Examiner*—Ricky D. Shafer
(74) *Attorney, Agent, or Firm*—Rader, Fishman & Grauer PLLC (57) ABSTRACT

A heliostat 5 for use in a sunlight concentration system for utilizing sunlight as energy according to this invention has a plurality of small concave mirror elements 8 and reflects and focuses sunlight reflected off the individual concave mirror elements to a light concentration portion as if upon reflection off a single large concave mirror 9. The angles of the concave mirror elements 8 are changed to define a single concave mirror having a predetermined curvature. When the incident angle of sunlight with respect to the concave mirror is large, the curvature is reduced (like a shallow dish). When the incident angle is small, the curvature is increased (like a deep dish).

7 Claims, 7 Drawing Sheets

HELIOSTAT FOR SUNLIGHT CONCENTRATION SYSTEM AND METHOD OF CONTROLLING THE SAME

BACKGROUND OF THE INVENTION

1. Field of the Invention

This invention relates to a heliostat for use in sunlight concentration systems to utilize sunlight as energy source.

2. Description of the Related Art

The effect of carbon dioxide to the global environment is a serious problem. The contemporary society's system relying on petroleum energy is an issue to be solved by every country. In this context, solar energy has received attention as clean energy with no effect on the environment. To utilize sunlight as energy source, it is required to efficiently concentrate sunlight for conversion into thermal energy and convert the thermal energy to electricity. Heliostats are used for the purpose. Each heliostat has a large concave mirror. A number of such heliostats are disposed around a concentration portion. The heliostats' concave mirrors are adjusted in orientation to constantly reflect and focus sunlight to a fixed concentration portion.

SUMMARY OF THE INVENTION

This conventional art, however, requires the disposition of a number of heliostats over a large area around a concentration portion so as to obtain great thermal energy, leading to an enormous structure of the sunlight concentration system. It is thus currently desired to develop a sunlight concentration system structure with heliostats having further increased efficiency in collecting sunlight, thus obtaining sufficient thermal energy with a smaller number of heliostats.

The present invention has focused attention to such a conventional art and provides a heliostat for sunlight concentration systems capable of increasing efficiency in collection of sunlight.

According to a first technical aspect of the present invention, a heliostat for a sunlight concentration system which constantly reflects and focuses sunlight to a concentration portion has a plurality of concave mirror elements with angles individually changeable, defining a single concave mirror having a predetermined curvature. The angles of the concave mirror elements constituting the concave mirror are respectively changed at least in a direction relating to the diurnal motion of the sun so as to reduce the curvature of the concave mirror when the incident angle of sunlight with respect to the optical axis of the concave mirror is large and to increase the curvature of the concave mirror when the incident angle of sunlight with respect to the optical axis of the concave mirror is small.

According to a second technical aspect of the present invention, the concave mirror elements are mounted to an equatorial frame.

According to a third technical aspect of the present invention, the concave mirror elements are mounted to an alt-azimuth frame.

According to a fourth technical aspect of the present invention, a method of controlling a heliostat for a sunlight concentration system which reflects and focuses sunlight to a light concentration portion includes the steps of (i) determining the orientations of main axes of a plurality of concave mirror elements having a first curvature so that the concave mirror elements define a single concave mirror having a second curvature, (ii) controlling the orientation of a main axis of the concave mirror so that incident sunlight is constantly reflected toward the light concentration portion, and (iii) changing the orientations of the main axes of the concave mirror elements so as to reduce the second curvature when the incident angle of sunlight with respect to the main axis of the concave mirror is large, and changing the orientations of the main axes of the concave mirror elements so as to increase the second curvature when the incident angle of sunlight with respect to the main axis of the concave mirror is small.

BRIEF DESCRIPTION OF THE DRAWINGS

FIGS. 6A to 6C illustrate aberrations in the concentration to the first focal point A of sunlight coming into concave mirrors having respective mirror surface shapes, in which FIG. 6A is about a concave mirror of a large curvature, FIG. 6B a concave mirror of a middle curvature, and FIG. 6C a concave mirror of a small curvature;

DESCRIPTION OF THE PREFERRED EMBODIMENT

With reference to the accompanying drawings, preferred embodiments of the present invention will be described below.

Figure 1:
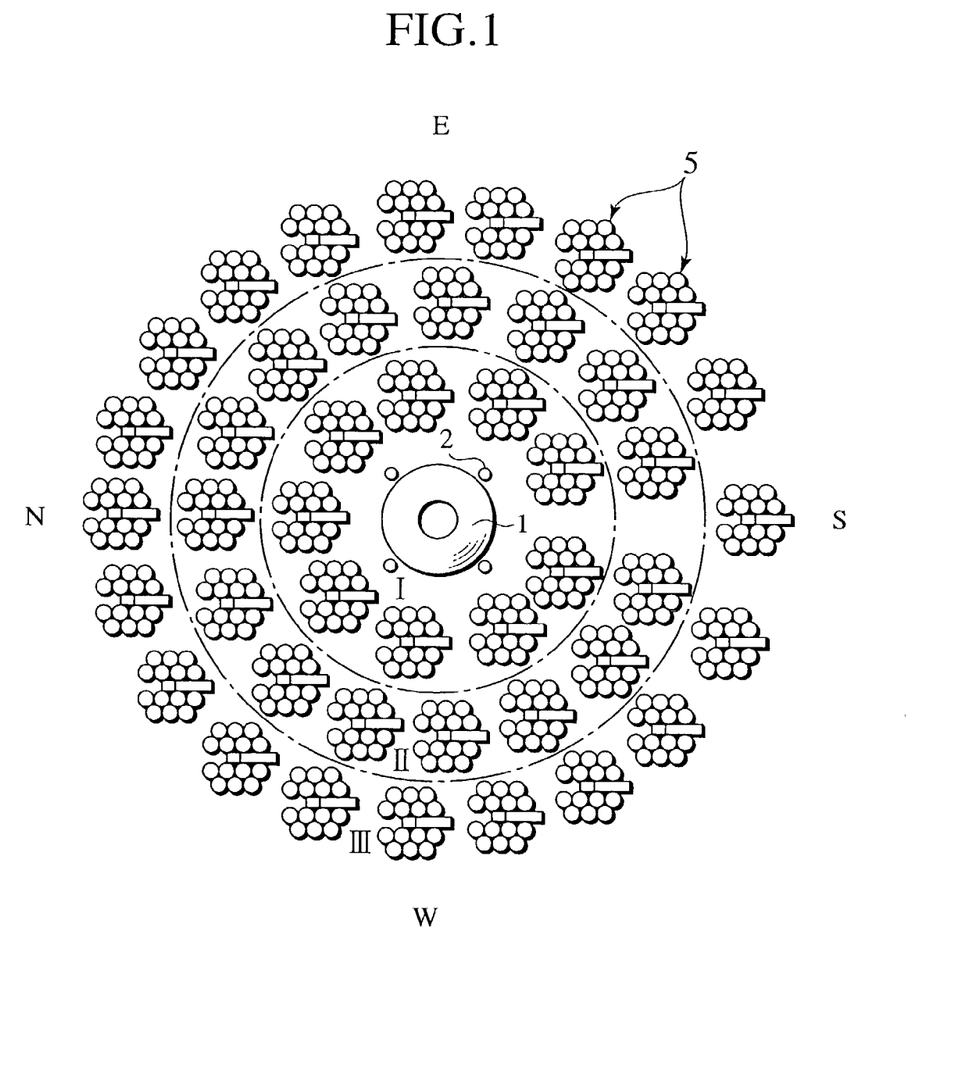
FIG. 1 is a plan view of a sunlight concentration system according to an embodiment of the present invention.
Figure 2:
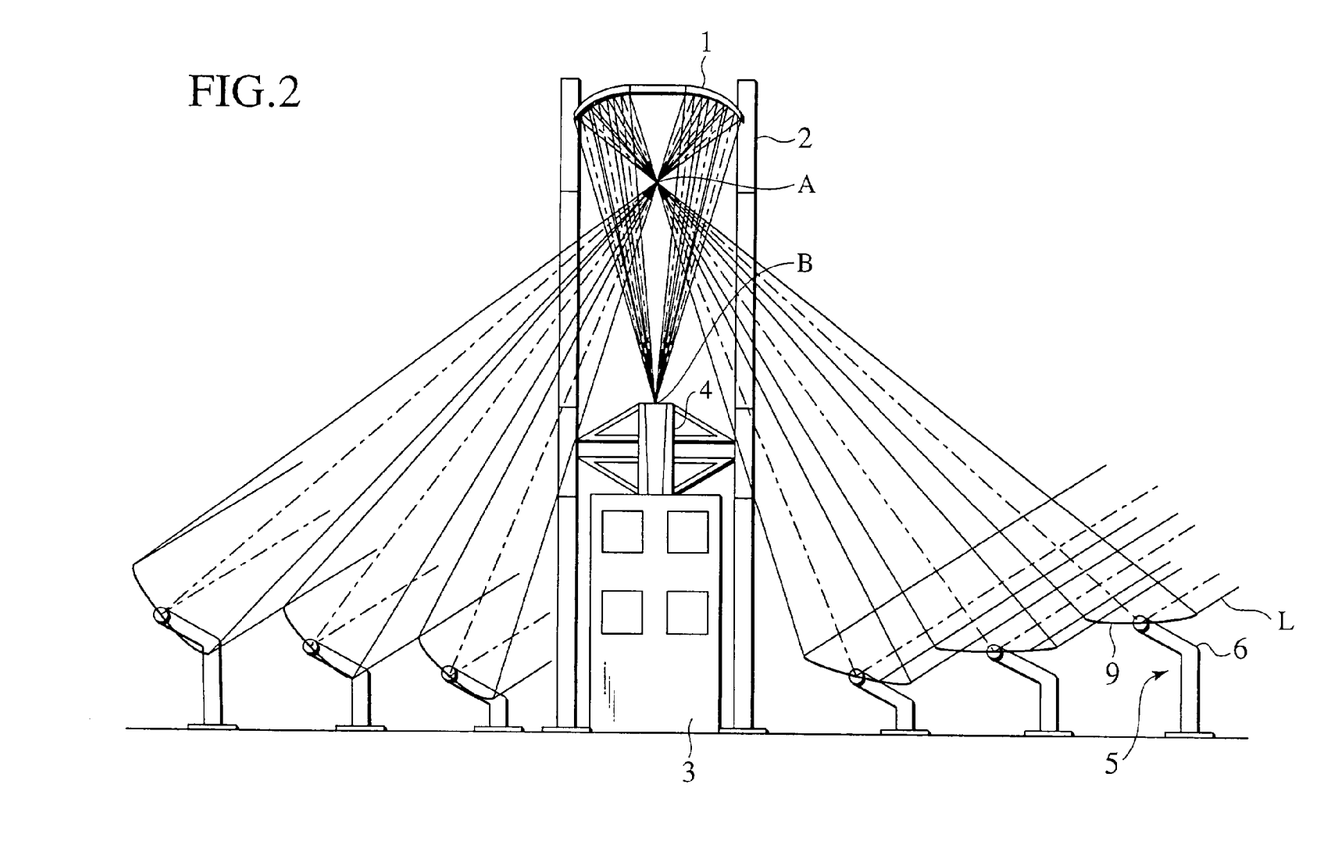
FIG. 2 is a side view of the sunlight concentration system according to the present invention.

FIGS. 1–7 illustrate a first embodiment of the present invention. Reference numeral 1 denotes an elliptic mirror positioned at a predetermined level with support towers 2, being oriented downward. The mirror surface shape of the elliptic mirror 1 constitutes a portion of an ellipsoid, below which a first focal point A and a second focal point B exist as a concentration portion. A thermal conversion facility 3 for converting sunlight L into thermal energy is established below the elliptic mirror 1. A converging mirror 4 in a tapered tube shape is provided on an upper portion of the thermal conversion facility 3. A number of heliostats 5 are arranged on the ground around the thermal conversion facility 3, encircling the elliptic mirror 1. Sunlight reflected from each heliostat 5, after only passing through the first focal point A, invariably reaches the thermal conversion facility 3 by way of the second focal point B and the converging mirror 4. This allows independent control of the main axis, curvature and the like of each heliostat 5. In FIGS. 1 and 2, it is assumed that the concentration system is established in an area in a middle latitude or a low latitude in the Northern hemisphere and the sun moves from the rear surface of the sheet (east) through the right side on the sheet (south) to the front surface of the sheet (west) (sunlight L is coming in from the south in the figures). Although the heliostats 5 are disposed on a substantially horizontal base in the embodiment of FIG. 2, they may be disposed on an inclined base in accordance with the installation location (e.g., at high latitudes).

Figure 3:
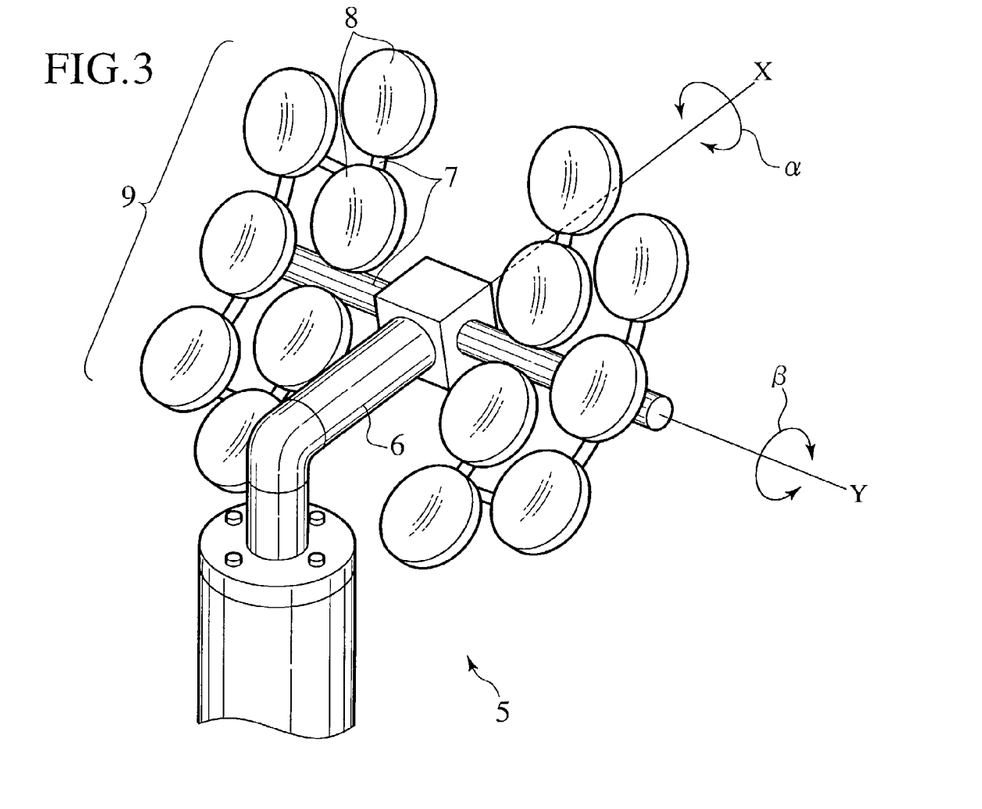
FIG. 3 is a perspective view of a heliostat.

A frame 7 rotatable about a right ascension axis (polar axis) X in a right ascension direction α and rotatable about a declination axis Y in a declination direction β is mounted to the distal end of a stationary shaft 6 constituting the right ascension axis (polar axis) X. The heliostat 5 has an equatorial mount system with a plurality of concave mirror elements 8 mounted on the frame 7. The concave mirror elements 8 individually have a round shape and define a single concave mirror (pseudo-concave mirror) 9 having a predetermined curvature in its entirety. The concave mirror 9 reflects and focuses sunlight L to the first focal point A of the elliptic mirror 1. The concave mirror 9 may be adapted to track the sun using a light quantity sensor or may be controlled in its orientation by computer. The mirror surface shape of the concave mirror 9 is preferably spherical, and more preferably, parabolic. The following description will be made with the mirror surface shape of the concave mirror 9 defined by each heliostat 5 as a spherical shape having a second curvature. If the surface shape is parabolic, the second curvature may be a spherically approximated curvature, or a predetermined focal length (of a parabolic surface) is used instead for characterization of the mirror surface shape as appropriate.

The concave mirror elements 8 constituting each heliostat 5 have the same mirror surface shape which is preferably spherical or plane. The following description will be made with the mirror surface shape of each concave mirror element as a spherical shape having a first curvature. The mirror surface shape of each heliostat 5 may depend on the distance between the heliostat 5 and the first focal point A. In FIG. 1, for example, it is possible to provide a first curvature $C_I$ to the concave mirror elements 8 of the heliostats 5 in group I positioned in the proximity of the first focal point A, a first curvature $C_{II}$ to the concave mirror elements 8 in group II positioned at a middle distance, and a first curvature $C_{III}$ to the concave mirror elements 8 in group III positioned at a large distance ($C_I \geq C_{II} \geq C_{III} \geq 0$). Plane mirrors with zero curvature also can define a desired concave mirror 9, which would be easily appreciated by those skilled in the art.

Figure 4:
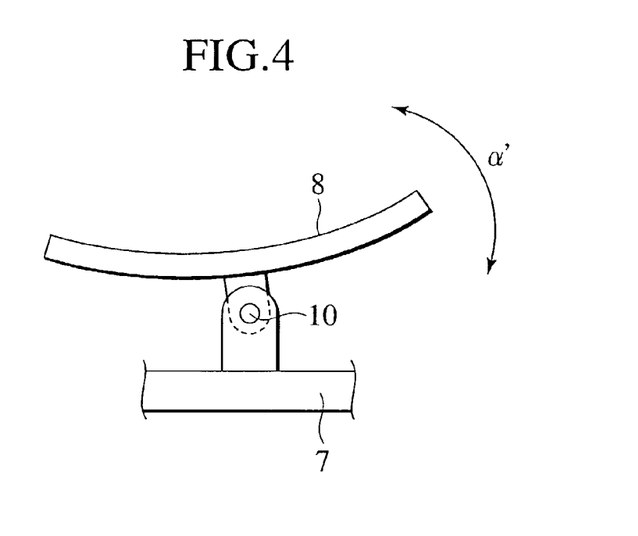
FIG. 4 is a side view of a mounting structure of a concave mirror element.

As shown in FIG. 4, each of the concave mirror elements 8 constituting the concave mirror 9 can be changed in angle with respect to the frame 7 in a direction relating to the diurnal motion of the sun (hereinafter referred to as a quasi-right ascension direction) about an articulation 10 (as a hinge in the embodiment of FIG. 4) having a theoretical axis in a direction intersecting the declination axis Y (preferably in a direction orthogonal thereto).

Changes in angles α' in the quasi-right ascension direction of the concave mirror elements 8 allow an angle distribution equivalent to a small curvature of the concave mirror 9 (like a shallow dish) and an angle distribution equivalent to a large curvature (like a deep dish). That is, as described later, instead of actually changing the mirror surface shape of the concave mirror 9, only the angles of the concave mirror elements 8 defining the concave mirror 9 are individually changed so as to achieve concentration characteristics equivalent to those of the concave mirror 9 having a predetermined curvature.

Small Concave Mirror Elements Define a Concave Mirror

Figure 5A:
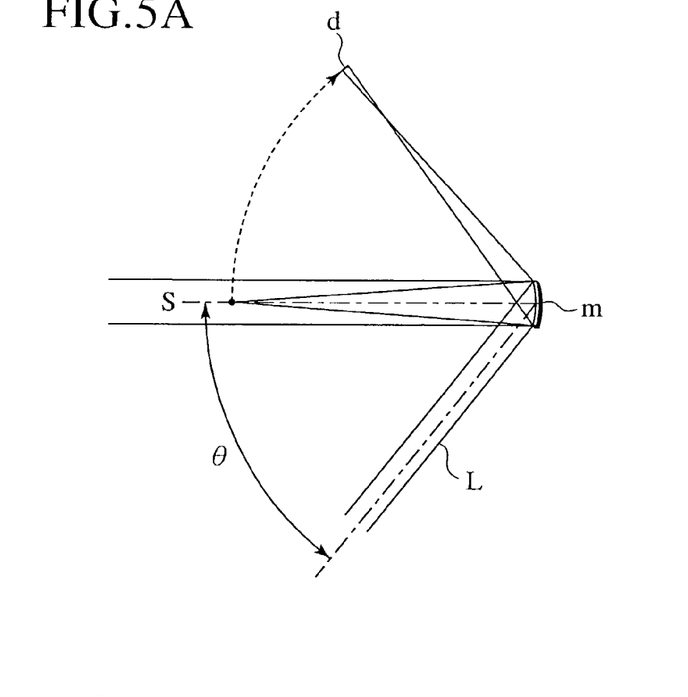
FIG. 5A illustrates an aberration caused by a small concave mirror at a first focal point A.
Figure 5B:
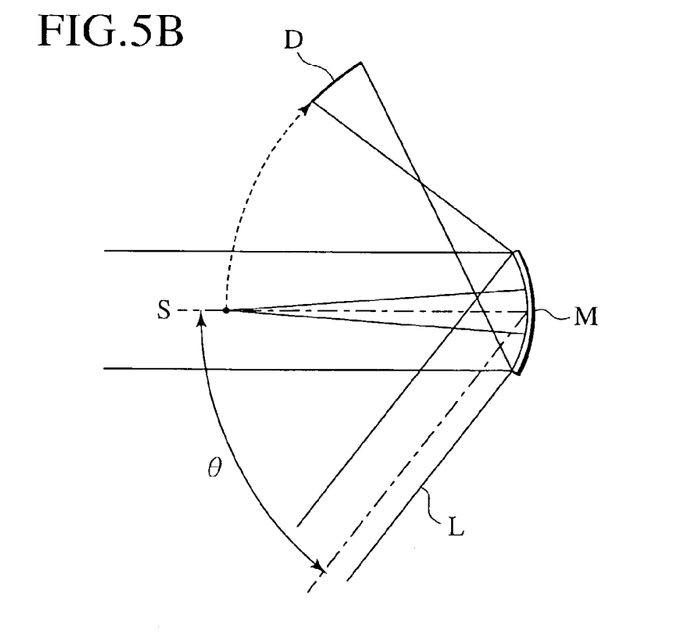
FIG. 5B illustrates an aberration of a large concave mirror.

A first aspect of improvement in efficiency of sunlight collection according to the present invention is to define the concave mirror 9 using a plurality of small concave mirror elements 8 to reduce aberration. As shown in FIG. 5B, when sunlight L is actually reflected off a single large concave mirror M, aberration D increases as the incident angle θ of sunlight L with respect to the optical axis S increases. By contrast, when sunlight L is reflected off a small concave mirror element m as shown in FIG. 5A, aberration d is smaller than the aberration caused by the concave mirror M at the same incident angle θ (d<D). According to the present invention, the small concave mirror elements 8 reflects and focuses sunlight L to the first focal point A of the elliptic mirror 1, resulting in efficient light collection with reduced aberration.

To Change Angles of Concave Mirror Elements According to Incident Angles

Figure 6A:
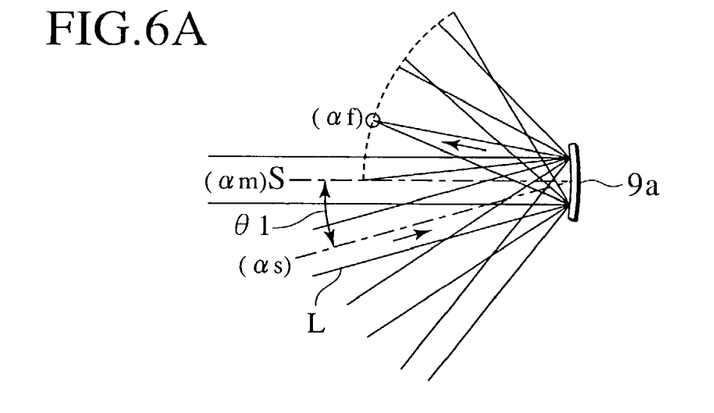
Figure 6B:
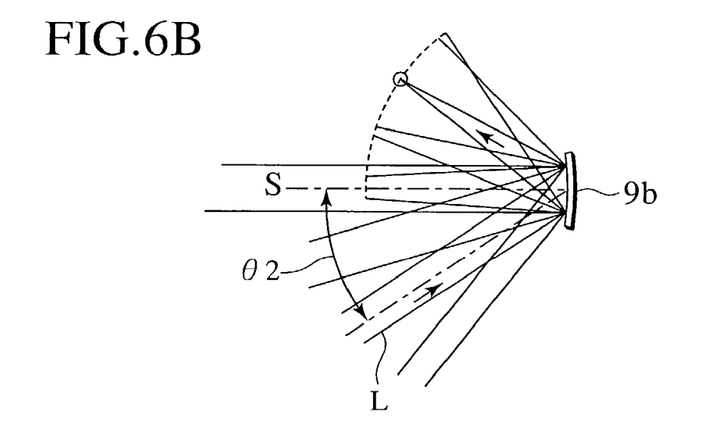
Figure 6C:
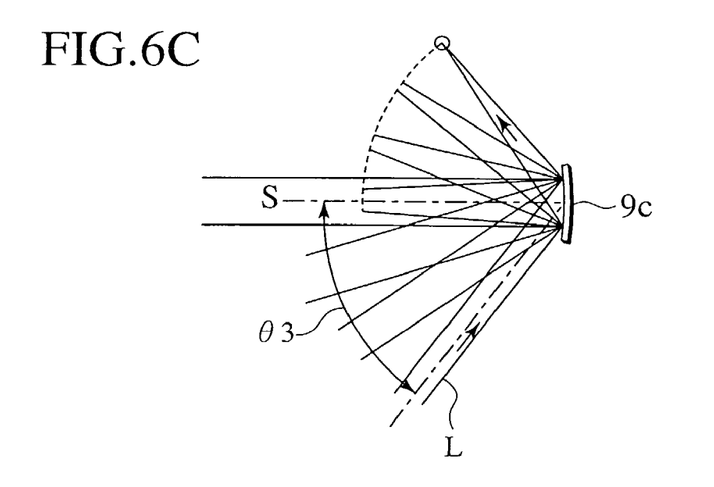

A second aspect of improvement in sunlight collection efficiency of this invention is to change the individual inclination angles of the concave mirror elements 8 to reduce aberration in accordance with change in the incident angle of sunlight L with the diurnal motion of the sun with respect to the main axis S of the concave mirror 9. FIGS. 6A to 6C illustrate the direction of the main axis S of the concave mirror 9 consisting of the concave mirror elements 8 as fixed to the left on the sheet. As apparent from FIG. 2, the main axis S of each concave mirror 9 must be moved to track the sun so as to receive sunlight L coming in at angles changing in the approximately right ascension direction with the diurnal motion of the sun and constantly focus the reflected sunlight to the fixed first focal point A. The direction of the main axis S of the concave mirror 9 is expressed in a rotation angle $α_m(t)$ about the right ascension axis (polar axis) (hereinafter referred to as a first rotation angle) and a rotation angle $β_m$ about the declination axis (hereinafter referred to as a second rotation angle) (the parameter t is time.). Similarly, the position of the sun is expressed in (first rotation angle, second rotation angle)= $(α_s(t), β_s)$. The direction of the first focal point A viewed from a specific concave mirror 9 is expressed in (first rotation angle, second rotation angle)=$(α_f, β_f)$. The direction $(α_m(t), β_m)$ to which the main axis S should be oriented is aimed at a substantially middle position between the directions of the sun $(α_s(t), β_s)$ and the first focal point A $(α_f, β_f)$ viewed from the concave mirror 9. Specifically, each heliostat 5 detects the position of the sun and the position of the first focal point A to adjust the orientation of its main axis, thereby enabling tracking of the sun. Since the second rotation angle $β_m$ does not depend on time so much, the tracking is enabled by using an equatorial for the control of the orientation of the main axis S and, once capturing the sun, only rotating the main axis S about the polar axis for tracking the sun in the right ascension direction in accordance with the diurnal motion of the sun. The rotation speed of the main axis S of the concave mirror 9 about the polar axis is approximately half the speed of the diurnal motion of the sun. Since the second rotation angle $β_s$ of the sun does not largely vary with the diurnal motion as described above, it is not necessary to change the second rotation angle $β_m$ with the diurnal motion of the sun when an equatorial is used for the direction control of the main axis S. Since the second rotation angle $β_s$ of the sun gradually varies with time, depending on season (orbital position of the earth), the second rotation angle $β_m$ of the main axis may be adjusted at each season or may be adjusted through the daily or sequential detection of position of the sun (apparent declination).

As shown in FIGS. 6A to 6C, aberration at the first focal point A (positions of broken lines) varies, depending on the incident angle θ of sunlight L with respect to the concave mirror 9. Thus each mirror surface shape (curvature) has a corresponding incident angle at which aberration is most reduced (as shown by circular marks in the figures). This allows the implementation of an adaptable concave mirror 9 having an optimum mirror surface shape (curvature) with respect to a predetermined incident angle.

More specifically, for a small incident angle θ1, a concave mirror 9a of a larger curvature (like a deep dish) provides reduced aberration of sunlight L reflected and focused by the concave mirror 9a in its entity (FIG. 6A). For a middle incident angle θ2, a concave mirror 9b of a middle curvature (like a slightly deep dish) provides reduced aberration of sunlight L reflected and focused by the concave mirror 9b in its entity (FIG. 6B). For a large incident angle θ3, a concave mirror 9c of a smaller curvature (like a shallow dish) provides reduced aberration of sunlight L reflected and focused by the concave mirror 9c in its entity (FIG. 6C). The tracking with the concave mirror 9 in accordance with the diurnal motion of the sun results in changes in the incident angle of sunlight (with respect to the concave mirror 9). To constantly implement a mirror surface shape (curvature) optimum to the incident angle, the inclination angles of the concave mirror elements 8 constituting the concave mirror 9 are individually changed. The actual difference in the mirror surface shape between the concave mirrors 9a–9c is slight.

To change combination in angles of the concave mirror elements 8 constituting the concave mirror 9 so as to define the concave mirror 9a of a large curvature or the concave mirror 9c of a small curvature means to change inclination angles of the concave mirror elements 8 so as to change the mirror surface shape of the concave mirror 9 (second curvature) without changing the mirror surface shape of the concave mirror elements 8 (first curvature).

Figure 7A:
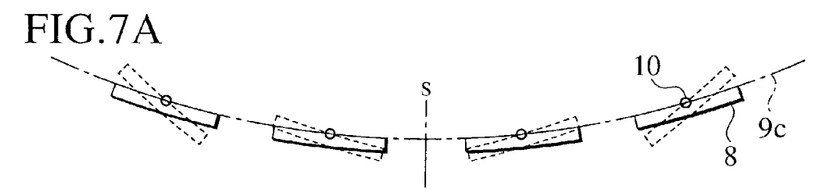
FIG. 7A illustrates concave mirror elements having a first curvature defining a concave mirror having a second curvature.
Figure 7B:
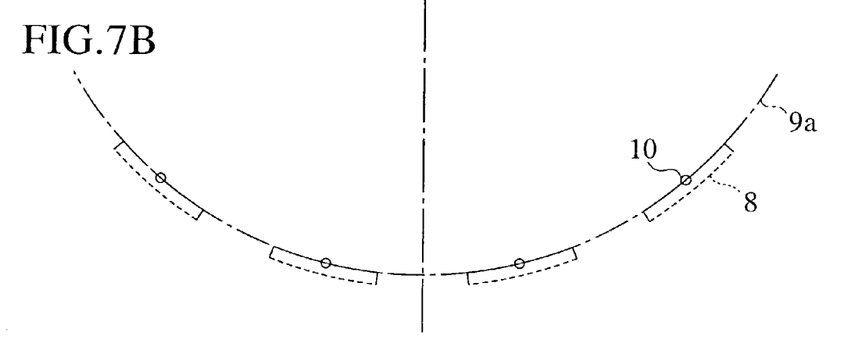
FIG. 7B illustrates the concave mirror having the second curvature changed through changes in angles of the concave mirror elements in FIG. 7A.

With reference to FIGS. 7A and 7B, more detailed description will be provided. Referring to FIG. 7A, a concave mirror 9c of a small curvature is implemented by a plurality of concave mirror elements 8 shown by solid lines. To increase the curvature of the concave mirror, the angles of the concave mirror elements about the respective articulates 10 are changed as shown by broken lines. This results in the implementation of optical characteristics equivalent to that of a larger concave mirror 9a as shown in FIG. 7B. The theoretical axis of each articulation 10 is fixed to the frame 7. Although the theoretical axes of articulations 10 are disposed to substantially define a concave mirror having a predetermined curvature in FIG. 7A, they may be disposed on a plane.

In this manner, the angles of the concave mirror elements 8 of the concave mirror 9 is optimized to reduce aberration, resulting in efficient concentration of light with the least aberration at each incident angle. The inclination angles of the concave mirror elements are controlled at least in the quasi-right ascension direction α' relating to the diurnal motion of the sun to enable efficient concentration without aberration. Because variation in incident angle due to the diurnal motion of the sun causes large aberration, to change an angle relating to the diurnal motion so as to reduce the aberration as much as possible increases efficiency in light concentration by that amount. Although FIG. 7 illustrates the theoretical axes of the articulations 10 lying on the mirror surfaces of the concave mirror elements 8, the articulations 10 supporting the concave mirror elements 8 may be implemented by the hinges 10 as shown in FIG. 4 to change the inclination angles of the concave mirror elements 8 through the rotation about the articulations 10. Further, the structure of the articulations 10 may be modified to change the angles of the concave mirror elements 8 also in the declination direction β.

The present embodiment has two important aspects regarding improvement in light concentration efficiency. First, a concave mirror consists of small concave mirror elements so as to reduce aberration. Specifically, instead of using a single large concave mirror to reflect sunlight as in a conventional manner, a plurality of small concave mirror elements define a single concave mirror (pseudo-concave mirror) and sunlight reflected off the concave mirror elements is focused to the concentration portion (A, B) as if upon reflection on a single large concave mirror, resulting in efficient concentration with reduced aberration. Second, the angles of the concave mirror elements are individually changed to reduce aberration in accordance with the incident angle of sunlight with respect to the concave mirror. For a large incident angle of sunlight, a concave mirror of a small curvature (like a shallow dish) provides reduced aberration of sunlight reflected and focused by the concave mirror in its entity. For a small incident angle, a concave mirror of a large curvature (like a deep dish) provides reduced aberration of sunlight reflected and focused by the concave mirror in its entity. Thus the optimum mirror surface shape is implemented by the control of the individual inclination angles of the concave mirror elements.

Other Embodiments

Figure 8:
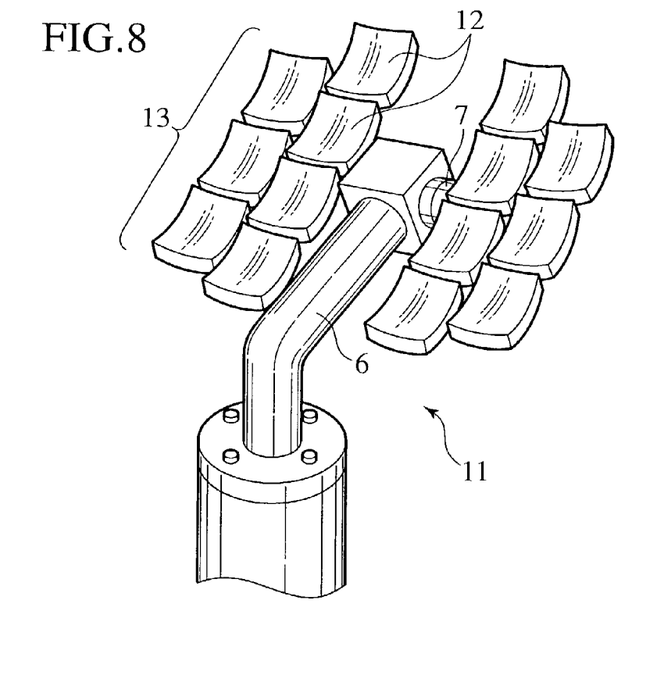
FIG. 8 is a perspective view of a heliostat according to a second embodiment of this invention.

FIG. 8 illustrates a second embodiment of the present invention. In this embodiment, concave mirror elements 12 of a heliostat 11 are quadrangular in shape. This allows close disposition of the concave mirror elements 12 in a concave mirror 13, resulting in collection of a larger amount of sunlight L. The other components, functions and effects are identical to those of the first embodiment, and the redundant description thereof is omitted.

Figure 9:
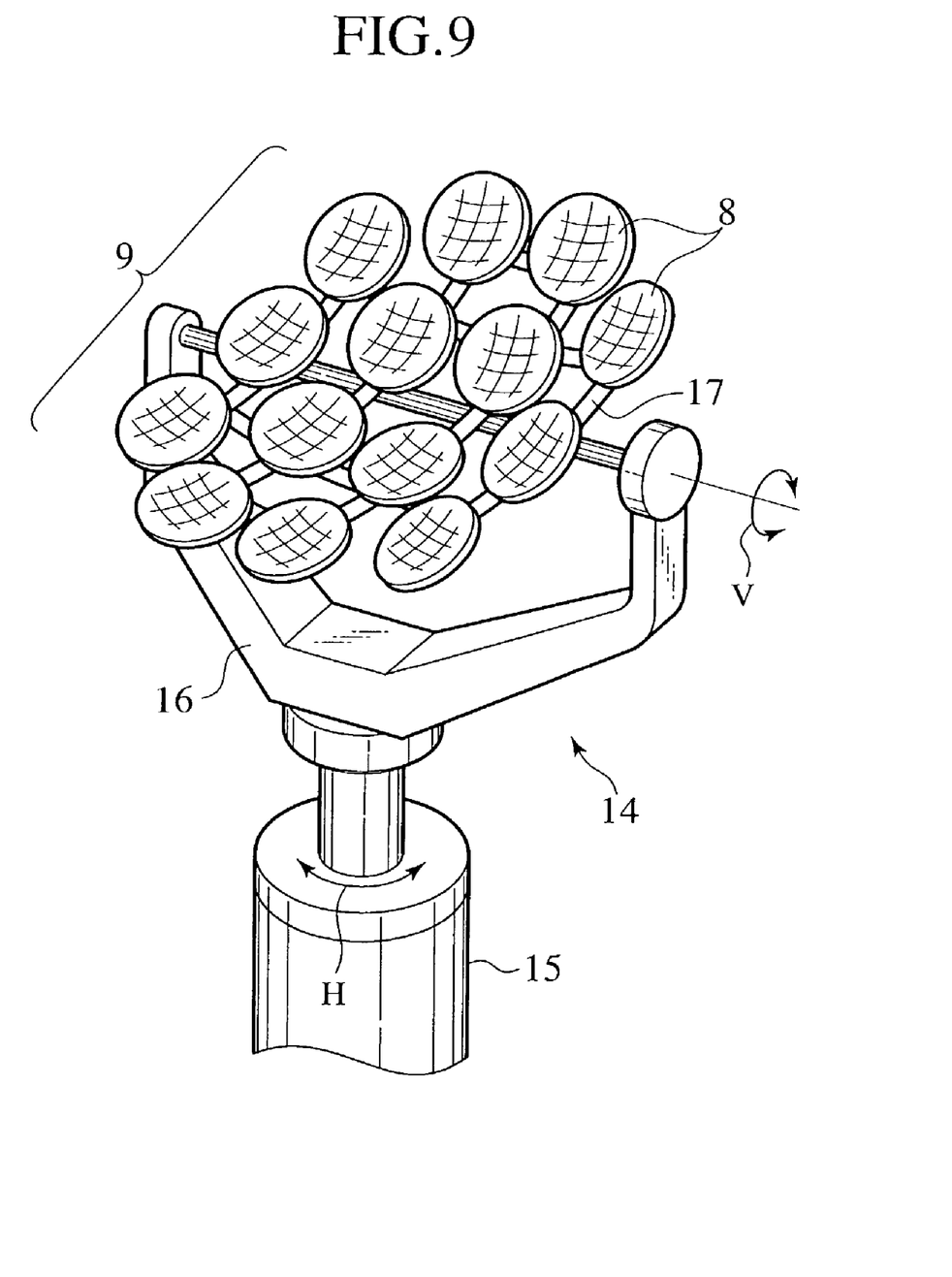
FIG. 9 is a perspective view of a heliostat according to a third embodiment of this invention.

FIG. 9 illustrates a third embodiment of the present invention. A fork 16 rotatable in an azimuth direction H is mounted to an upper portion of a support pole 15 of a heliostat 14. A frame 17 rotatable in an altitude direction V is mounted to the fork 16. A plurality of concave mirror elements 8 are mounted to the frame 17, defining a concave mirror 9. The concave mirror 9 is controlled in orientation using an azimuth sensor and an altitude sensor not shown so as to constantly reflect and focus sunlight L to a fixed concentration portion. The angles of the concave mirror elements 8 are variable in a direction relating to the diurnal motion of the sun detected by the azimuth and altitude sensors not shown. The heliostat 14 of this embodiment is simple in structure because of its alt-azimuth mounting which allows rotation in the azimuth direction H and the altitude direction V. The other components, functions and effects are identical to those of the above embodiments, and the redundant description thereof is omitted.

According to the present invention, small concave mirror elements constitutes a concave mirror and the individual angles of the concave mirror elements are changed for reduced aberration in accordance with the incident angle of sunlight with respect to the concave mirror, resulting in increased efficiency in collection of sunlight.

This application claims benefit of priority under 35USC §119 to Japanese Patent Applications No. 2002-197826, filed on Jul. 5, 2002, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A heliostat for a sunlight concentration system which reflects and focuses sunlight to a light concentration portion, said heliostat comprising a frame member (7) rotatable according to a diurnal motion of the sun and a plurality of concave mirror elements (8) having a first curvature, with at least two concave mirror elements individually and pivotably connected to the frame member via an articulation (10), orientations of main axes of said concave mirror elements being variable, said concave mirror elements defining a single concave mirror having a second curvature, an orientation of a main axis of said concave mirror being controlled so as to constantly reflect incoming sunlight toward said light concentration portion, wherein:

the orientations of the main axes of said concave mirror elements are changed so as to reduce said second curvature when the incident angle of sunlight with respect to the main axis of said concave mirror is large; and the orientations of the main axes of said concave mirror elements are changed so as to increase said second curvature when the incident angle of sunlight with respect to the main axis of said concave mirror is small.

2. A heliostat of claim 1, wherein said plurality of concave mirror elements are mounted to a frame rotatable about a polar axis and a declination axis.

3. A heliostat of claim 1, wherein said plurality of concave mirror elements are mounted to a frame rotatable in an altitude direction and an azimuth direction.

4. A heliostat of claim 2, wherein said plurality of concave mirror elements are mounted to said frame each articulately rotatable about a theoretical axis oriented to intersect said declination axis.

5. A heliostat of one of claims 1 to 4, wherein said concave mirror elements are quadrangular in shape.

6. A method of controlling a heliostat for a sunlight concentration system which reflects and focuses sunlight to a light concentration portion, said heliostat including a frame member (7) rotatable according to a diurnal motion of the sun and a plurality of concave mirror elements (8) having a first curvature, with at least two concave mirror elements individually and pivotably connected to the frame member via an articulation (10), said method comprising the steps of:

determining the orientations of main axes of the plurality of concave mirror elements with each concave mirror element having a first curvature so that said concave mirror elements define a single concave mirror having a second curvature;

controlling the orientation of a main axis of said single concave mirror at least in a right ascension direction so that incident sunlight is constantly reflected toward said light concentration portion; and changing the orientations of the main axes of said concave mirror elements so as to reduce said second curvature when the incident angle of sunlight with respect to the main axis of said concave mirror is large, and changing the orientations of the main axes of said concave mirror elements so as to increase said second curvature when the incident angle of sunlight with respect to the main axis of said concave mirror is small.

7. A controlling method of claim 6, wherein the orientations of the main axes of said concave mirror elements are each changed at least about a theoretical axis intersecting a theoretical axis defining a declination.

* * * * *